(12) United States Patent
Marquet et al.

(10) Patent No.: US 7,284,269 B2
(45) Date of Patent: Oct. 16, 2007

(54) HIGH-SPEED ADAPTIVE STRUCTURE OF ELEMENTARY FIREWALL MODULES

(75) Inventors: Bertrand Marquet, Ottawa (CA); Scott David D'Souza, Ottawa (CA); Paul Kierstead, Ottawa (CA)

(73) Assignee: Alcatel Canada Inc., Kanata, ON (CA)

( * ) Notice: Subject to any disclaimer, the term of this patent is extended or adjusted under 35 U.S.C. 154(b) by 638 days.

(21) Appl. No.: 10/156,083

(22) Filed: May 29, 2002

(65) Prior Publication Data

US 2003/0226027 A1   Dec. 4, 2003

(51) Int. Cl.
*H04L 29/00* (2006.01)
*H04L 29/02* (2006.01)

(52) U.S. Cl. .................. 726/13; 726/2; 726/3; 726/11; 713/153; 713/154; 709/238; 709/239; 709/240; 709/244

(58) Field of Classification Search ............... None
See application file for complete search history.

(56) References Cited

U.S. PATENT DOCUMENTS

| | | | |
|---|---|---|---|
| 6,141,755 A | 10/2000 | Dowd et al. ............. 713/200 |
| 7,055,173 B1* | 5/2006 | Chaganty et al. ............ 726/11 |
| 2002/0078377 A1* | 6/2002 | Chang et al. ............... 713/201 |
| 2002/0133586 A1* | 9/2002 | Shanklin et al. ............ 709/224 |
| 2002/0143850 A1* | 10/2002 | Caronni et al. ............ 709/201 |
| 2003/0131262 A1* | 7/2003 | Goddard ................... 713/201 |

OTHER PUBLICATIONS

S. Goddard, R. Kieckhafer, Y. Zhang. "An Unavailability Analysis of Firewall Sandwich Configurations," hase, p. 0139, Sixth IEEE International Symposium on High Assurance Systems Engineering (HASE'01), 2001.*
O. Kremien, J. Kramer. "Methodical Analysis of Adaptive Load Sharing Algorithms" (Nov. 1992) IEEE Transactions on Parallel and Distributed Systems, vol. 3, No. 6.*
Cosmos "How Outpost Processes Rules Internally" (Dec. 18, 2001) Moderator post to Outpost Firewall User's Support Forum. Thread at http://outpostfirewall.com/forum/showthread.php?t=2136.*
"A reference model for firewall technology", Christoph L. Schuba et al., Department of Computer Sciences, Purdue University, 1997.

* cited by examiner

*Primary Examiner*—Syed A. Zia
(74) *Attorney, Agent, or Firm*—Marks & Clerk; S. Mark Budd

(57) ABSTRACT

A communications security system has been described. The security system in the form of a firewall is made up of a plurality of communicatively coupled sets of modules in a matrix configuration. The modules may be implemented in hardware and software in order to rely on the advantages of each technology. Data packets are typically coupled to an ingress side of the firewall where policy rules having the highest importance are checked first. The result is a high speed system having carrier class availability.

16 Claims, 2 Drawing Sheets

Firewall Structure

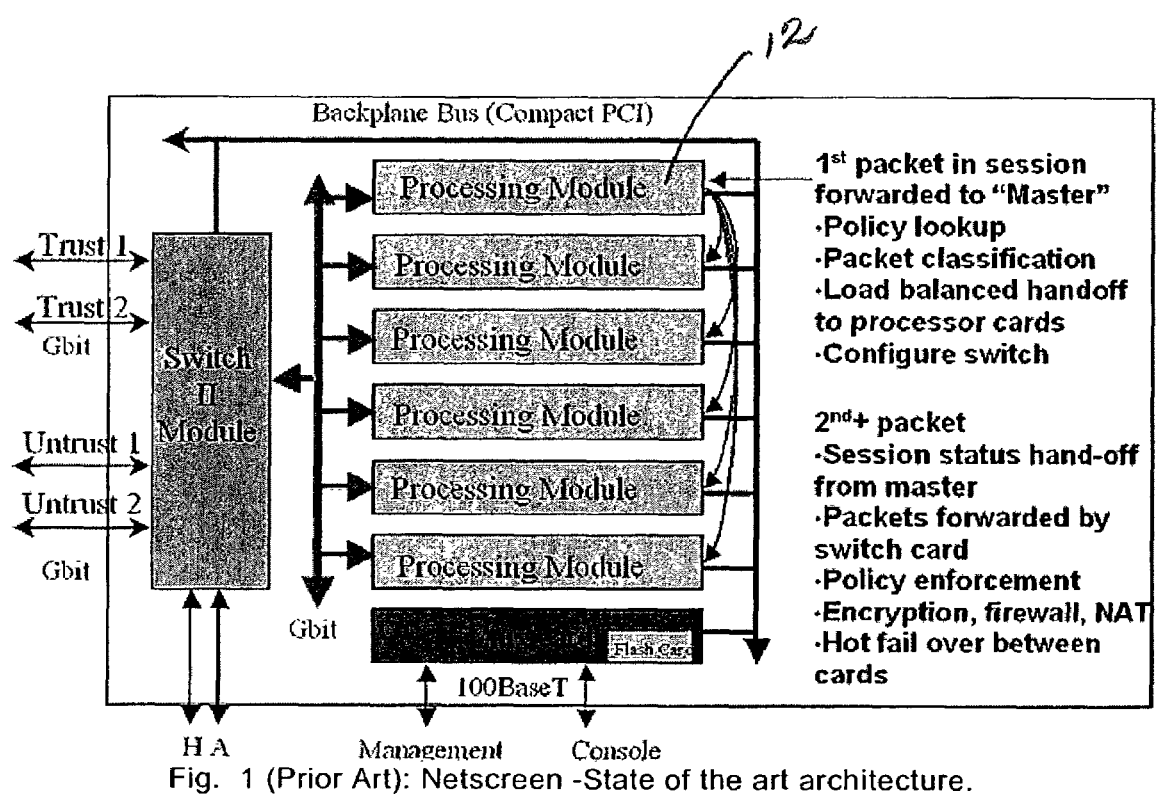
Fig. 1 (Prior Art): Netscreen -State of the art architecture.

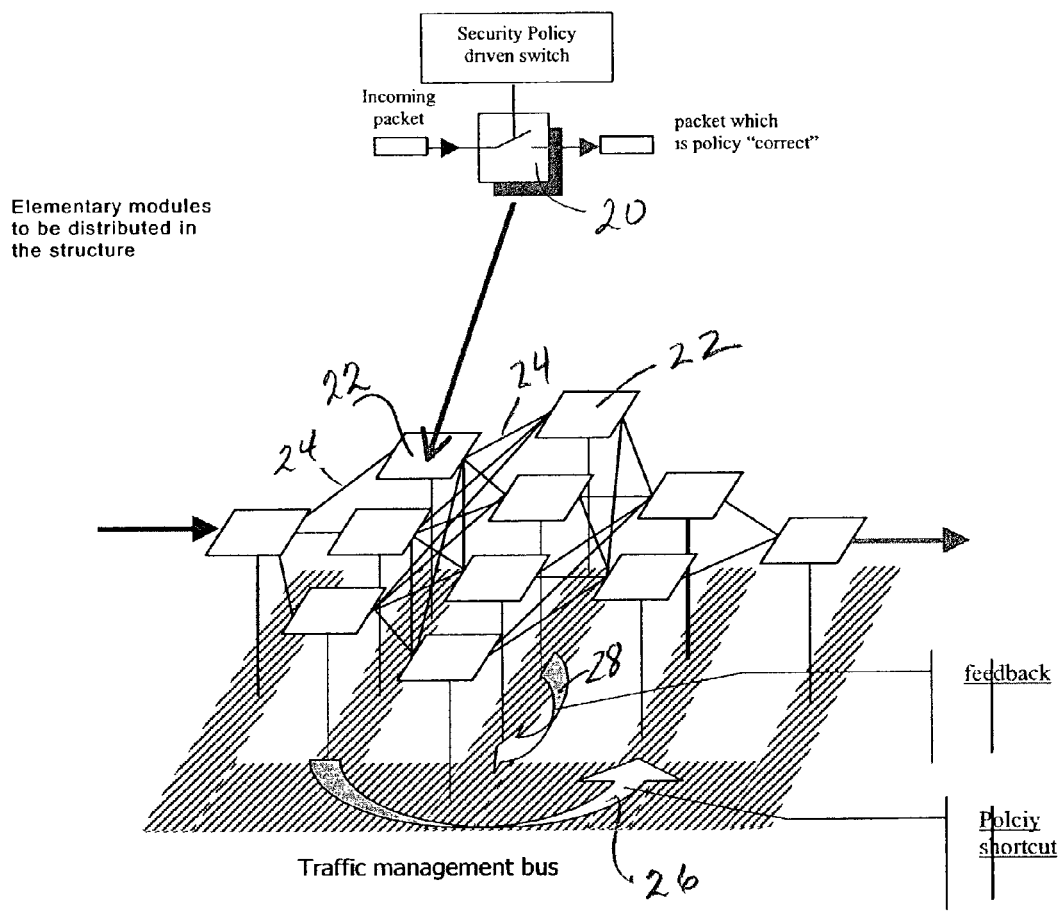
Fig 2: Firewall Structure

HIGH-SPEED ADAPTIVE STRUCTURE OF ELEMENTARY FIREWALL MODULES

FIELD OF THE INVENTION

This application relates to data communications networks and more particularly to systems and methods for providing communications security in data networks.

BACKGROUND

Communications over data networks has become an essential aspect of today's commercial activities and personal correspondence. One of the major hindrances to a greater acceptance of this medium is the concern over the security of personal and corporation-sensitive information carried between the inside world and the outside world. An important part of any network connected to the outside world today is a security mechanism frequently known as a firewall. A firewall has one simple function, to examine data and pass or reject it based on some established policy information. This policy could range from a very simple set of rules to one that is highly complex with thousands of rules. A firewall that is fast, tolerant to internal faults, and whose policies can be easily changed is desirable, particularly for carrier-grade services.

PRIOR ART

Most current solutions involve large, complex systems to evaluate data, and are mostly static in terms of architecture i.e. their policies can not be changed easily.

There are, of course, several firewall products on the market today. The architecture of some of these products, such as the Netscreen architecture, is composed of several hardware modules in parallel, while others are based entirely in software.

In the hardware based architecture, hot fail-over may be taken into account, but real time policy changing and reconfiguration is limited. i.e. once a session policy examination is launched, policy rule changes are limited in scope.

The prior art in relation to firewall technology is well described in the publication: "A reference Model for Firewall technology" Christopher L. Schuba and Eugene H. Spafford COAST Laboratory, Department of Computer Sciences, Purdue University, 1398 Computer Science Building West Lafayette, Ind. 47907-1398. The publication introduces a reference model that captures existing firewall technologies and allows for an extension to networking technologies to which it was not applied previously. It can serve as a framework in which firewall systems can be designed and validated.

The relevant firewall prior art also includes U.S. Pat. No. 6,141,755 which issued Oct. 31, 2000 to Dowd, et al entitled "Firewall security apparatus for high-speed circuit switched networks". In this patent, security management is achieved through active connection management with authentication and is suited to the cell-based environment of high-speed circuit switched networks and to the mix of circuit switched traffic, where Internet Protocol (IP) datagrams comprise a fraction of the total traffic. In the patent, information in the signalling cells is used to determine which flows, rather than which individual cells, are allowed to pass through the firewall. A hierarchical method has been devised, in which the physical location of the inter-related components may be de-coupled. Once a flow has been validated, the cells associated with that flow are allowed to proceed through the firewall at line-speed with limited intervention and no performance degradation. The patented invention addresses the need for high-speed throughput but may lack desired fault tolerance because of the single point of failure in flow validation.

Current parallel solutions, i.e. the closest to the present architecture, employ modules, which are complete, or close to complete, firewalls. Consequently, in order to address performance of the firewall relating to a particular policy, entire modules that contain additional, unneeded, functionality must be added.

Hardware-only solutions can make it very difficult to make fast policy changes in the firewall, while software solutions allow fast changes but have slower throughput.

SUMMARY OF THE INVENTION

The firewall architecture of the present solution allows a structure of hardware and software modules to dynamically take advantage of the benefits of both implementations. The architecture allows for the failure or temporary removal/disabling of some of the modules, without the collapse of the entire system.

The present solution allows aspects of the firewall performance relating to particular policies to be upgraded independently of other policies, thereby avoiding the addition of unnecessary functionality. This capability is provided by an architecture based on modules that each address a particular policy.

In the prior art, firewalls are constructed with a small number of complex elements and may or may not have redundant elements. The present solution provides a dynamic, complex structure of simple elements. The structure allows for both hardware and software implementations of the small elements and for redundancy of the modules.

Notes: the term "packet" is used generically herein to refer to a piece of data, not to be confused with the IP term "packet". A packet hereinafter could refer to data in any layer of the OSI reference model.

Therefore in accordance with a first aspect of the invention there is provided a firewall for a data communications network comprising: sets of modules, each set of the sets including at least one module communicatively coupled to at least one module of another set, and each module being operable to send a received data packet to a communicatively coupled module in dependence upon information contained in the received data packet being in compliance with a particular policy, which compliance is determined by the module.

In accordance with a second aspect of the invention there is provided a method of filtering data packets in a data communications system comprising: providing sets of modules, each set of the sets including at least one module communicatively coupled to at least one module of another set, and operating each module to send a received data packet to a communicatively coupled module in dependence upon information contained in the received data packet being in compliance with a particular policy, which compliance is determined by the module.

In accordance with another aspect of the invention there is provided a method of processing data packets at a firewall in a data communications system, the firewall having sets of modules, each communicatively coupled to at least one module of another set, the method comprising: receiving the data packet at a first set of modules; examining the data packet in relation to a particular policy; and passing the data packet to a communicatively coupled module if the data packet is in compliance with the particular policy.

Accordingly, this invention provides a new way of providing very high-speed firewalls having carrier class availability.

BRIEF DESCRIPTION OF THE DRAWINGS

The invention will now be described in greater detail with reference to the attached drawings wherein:

FIG. 1 shows a prior art firewall architecture; and

FIG. 2 is a pictorial view of the firewall architecture of the present invention.

DETAILED DESCRIPTION OF THE INVENTION

FIG. 1 is a high level drawing of the aforementioned Netscreen architecture.

As shown in FIG. 1 the prior art architecture is composed of multiple hardware processing modules 12 connected in parallel. As discussed earlier policy rules for a firewall architecture comprising hardware modules can not be changed dynamically. Thus, once a session has been launched policy rules regarding acceptance or rejection of data cannot be changed.

FIG. 2 illustrates the module concept according to the present invention.

A module can be modelled as a switch 20 as can be seen at the upper section of FIG. 2. The module evaluates it's data against some defined policy, allowing the data to pass through if the rules are met, or to block it if they are not. A module could examine a single part of a packet at one layer or could analyse the packet across many layers. Each module 22 is implemented in either hardware or software. A module 22 could be implemented in both hardware and software, with both modules having exactly the same functionality. An example module could be a device that examines the source IP address of a packet (in this case we refer to the layer 3 meaning of the term "packet") and checks it for validity. Each module provides a signal indicating if it is currently busy processing a packet or whether it is free for use.

The basic modules are created into a structure as can be seen in the lower section of FIG. 2. Each column of the structure contains modules with identical functionality, but not necessarily the same implementation. Some could be built using hardware others written in software.

Each module is connected to some or all of the modules in the next column. Each connection 24 has an assigned weight, with the sum of all weights for connections from a module adding to a constant value. Data is then processed in the following manner:

1. Incoming packets of data are passed to the ingress column (left column in FIG. 2) of the structure.
2. The first modules examine their packets and determine whether the data matches their rules and should be passed on or not. If a module determines that the data fails it's criteria, it is discarded and the module indicates that it is free for another packet.
3. Modules that have elected to pass data pick one of its connections for use based on a weighted random calculation.
4. If the connected module indicates that it is busy, the corresponding weight for that connection is adjusted downwards and the weights for the remaining connections are adjusted upwards. Then step 3 is repeated until a free module is found.
5. Once a free module is obtained, the data is passed to it for processing and the current module indicates that it is ready to receive another packet of information.
6. Packets that exit from the right-most column of the structure have met all policy rules.

Preferably, the modules are arranged such that the most important rules concerning the system to be protected are checked first, i.e. the modules associated with these rules are on the ingress side of the structure. In this way, packets that do not conform to these rules are immediately stopped so that module resources are not wasted by first checking other, less important, rules.

There are several advantages with this method of connecting modules in this fashion. The modules can be implemented in either hardware or software at each level of the structure. This allows for some of the modules to take advantage of fast turnaround time for policy changes in software, while still having the faster processing speeds of hardware modules. Although there will be a difference in the processing time for different hardware and software modules, the weighting system for connections will automatically balance the packet loads to compensate.

Another advantage comes from the redundancy of the structure if one or more modules are removed due to a fault or for updating. The adaptive weighting will adjust to compensate for the missing elements and redirect packets to the remaining modules.

In addition, modules may be added to address specific performance problems rather then duplicating the entire system. In particular, policies for a given application may strain one column or the other more heavily than typical; by the addition of modules only to that column the performance bottleneck can be addressed without adding unnecessary functionality.

The solution efficiently filters packets by having modules on the ingress side examining the most important rules concerning the system to be protected in order to immediately stop packets that do not conform to this rule in order not to waste time examining other rules.

As shown in FIG. 2 an underlying traffic management bus allows modules in each or certain columns to communicate with modules in other columns without using inter-module connections 24. This allows for policy shortcut options 26 which might occur, for example, if a packet need not be examined in accordance with some rules. In this case the packet is sent directly to a downstream module for examination there. The management bus also facilitates a feedback option 28. This option might be invoked, for example, if a downstream module determines that a packet is encapsulated and should be reexamined by a previous module or element.

A potential disadvantage of this system is the complexity in the actual implementation of the structure. The number of connections between two columns of N and M modules is N×M, and a firewall with thousands of rules would have a like number of columns. Therefore, the number of connections that could be present in even a small dimensional system could be very large. This causes problems in arbitrating the traffic between modules. Another disadvantage could include difficulty in mapping actual policy to the structure.

Although particular embodiments of the invention have been described and illustrated it will be apparent to one skilled in the art that changes can be made without departing from the basic concept. It is to be understood, however, that such changes will fall within the full scope of the invention as defined in the appended claims.

The invention claimed is:

1. A firewall for a data communications network, comprising:
   an ingress module connected to the communications network on a first side of the firewall;
   an egress module connected to the communications network on a second side of the firewall;
   a modular structure having a plurality of sets of a plurality of modules each, the sets being arranged in series such that one set is upstream of the egress module and the remaining sets are upstream of exactly one of the sets, and such that one set is downstream of the ingress module and the remaining sets are downstream of exactly one of the sets;
   for each module in each of the sets, a plurality of connections, each connection coupling the module to one of the modules in the set downstream of the module's set; and
   for each module in each of the sets, a rule particular to that set, wherein each module in the modular structure forwards a data packet received from an upstream module to one of the modules in the set downstream of the module's set if the module determines that information within the data packet complies with the rule of the set to which the module belongs.

2. The firewall of claim 1 further comprising selecting means at each module within the sets for selecting a free module from the set downstream of the module's set, and wherein the module forwards the data packet to the free module.

3. The firewall of claim 2 further comprising indicating means at each module within the sets for indicating to an upstream module whether the module is flee to process data packets.

4. The firewall of claim 3 wherein the selecting means comprise means for receiving a signal from each of the modules in the set downstream of the module's set, each signal indicating whether the respective module is free, and wherein the selecting means are configured to only select a module as the free module if a signal is received indicating that tat module is free.

5. The firewall of claim 3 further comprising adaptive weighting means within each module of the sets for assigning a weighting to each connection, and wherein the selecting means are configured to randomly select a module as the free module in accordance with the weightings of the connections leading to the respective modules.

6. The firewall of claim 5 wherein the selecting means comprise means for receiving a signal from each of the modules in the set downstream of the module's set, each signal indicating whether the module generating the signal is free, and wherein the selecting means are configured to only select a module as the free module if a signal is received indicating that that module is free.

7. The firewall of claim 6 wherein the adaptive weighting means are configured to adjust the weighting of a connection downward if a signal is received from the module to which the connection leads indicating that that module is not free.

8. The firewall of claim 7 wherein the sets are arranged such that the modules in the set at the ingress side of the firewall enforce a most important rule, and such that progressively less important rules are enforced by modules within downstream sets.

9. The firewall of claim 1 wherein the sets are arranged such that the modules in the set at the ingress side of the firewall enforce a most important rule, and such that progressively less important rules are enforced by modules within downstream sets.

10. A method of filtering data packets in a data communication system, comprising:
    receiving a data packet at a first module;
    determining whether the data packet satisfies a first rule assigned to the first module;
    if the data packet satisfies the first rule, selecting a first free downstream module from amongst a first set of a plurality of downstream modules by:
    a. applying a respective random weighting to each downstream module in the first set;
    b. randomly selecting one of the downstream modules in accordance with the random weightings;
    c. receiving from the randomly selected downstream module a signal indicating whether the randomly selected downstream module is free;
    d. if the signal indicates that the randomly selected downstream module is free, selecting the randomly selected downstream module as the first free downstream module; and
    e. if the signal indicates that the randomly selected downstream module is not free, repeatedly randomly selecting downstream modules and receiving signals as to whether the selected modules are free, until a downstream module is selected for which the received signal indicates that the downstream module is free, and then selecting that downstream module as the first free downstream module; and
    if the data packet satisfies the first rule, forwarding the data packet to the first free downstream module.

11. The method of claim 10 further comprising adjusting the random weighting of a downstream module downward if a signal is received indicating that the downstream module is not free.

12. A method of filtering data packets in a data communication system, comprising:
    receiving a data packet at a first module;
    determining whether the data pack satisfies a first rule assigned to the first module;
    if the data packet satisfies the first rule, selecting a first free downstream module from amongst set of a plurality of downstream modules;
    if the data packet satisfies the first rule, forwarding the data packet to the first free downstream module;
    at the first free downstream module, determining whether the data packet satisfies a second rule assigned to each module within the first set of downstream modules; and
    if the data packet satisfies the second rule, repeatedly selecting free downstream modules from successive downstream sets, forwarding the data packet to the free modules, and determining whether the data packet satisfies a rule assigned to respective downstream sets of modifies, until either the data packet fails to satisfy one of the rules or the data packet is passed to an egress module,
    whereby the data packet is passed successively through a series of sets of modules, each module in a set applying a rule assigned to the set.

13. The method of claim 12 wherein the sets of modules are arranged such that the rules assigned to the sets are progressively less important for downstream sets, such that data packets cascading through the sets of modules are checked for compliance with more important rules before less important rules.

14. The method of claim 12 wherein for each module at which the data packet is determined to satisfy the rule of the set to which the module belongs, selecting a free downstream module comprises:

applying a respective random weighting to each downstream module;

randomly selecting one of the downstream modules in accordance with the random weightings;

receiving from the randomly selected downstream module a signal indicating whether the randomly selected downstream module is free;

if the signal indicates that the randomly selected downstream module is free, selecting the randomly selected downstream module as the free downstream module; and if the signal indicates that the randomly selected downstream module is not free, repeatedly randomly selecting downstream modules and receiving signals indicating whether the selected modules are free, until a downstream stream module is selected for which the received signal indicates the downstream module is free, and then selecting that downstream module as the first free downstream module.

15. The method of claim 14 further comprising adjusting the random weighting of a downstream module downward if a signal is received indicating that the downstream modules is not free.

16. The method of claim 14 wherein the sets of modules are arranged such that the rules assigned to the sets are progressively less important for downstream sets, such that data packets cascading through the sets of modules are checked for compliance with wore important rules before less important rules.

* * * * *